United States Patent [19]

Lusk et al.

[11] 3,733,586

[45] May 15, 1973

[54] METER INTERROGATION SYSTEM HAVING STROBE LOGIC CONTROL

[75] Inventors: Joe F. Lusk, Medford; William H. Rood; Herbert L. Feldman, both of Acton, all of Mass.

[73] Assignee: General Public Utilities Corporation, New York, N.Y.

[22] Filed: Mar. 14, 1972

[21] Appl. No.: 234,670

Related U.S. Application Data

[63] Continuation of Ser. No. 53,623, July 9, 1970.

[52] U.S. Cl. ..........................340/151 R, 340/310 R

[51] Int. Cl. ..............................................H04q 9/00

[58] Field of Search .......................340/151 R, 310 R

[56] References Cited

UNITED STATES PATENTS

| | | | |
|---|---|---|---|
| 3,357,011 | 12/1967 | Diaz | 340/151 X |
| 3,531,771 | 9/1970 | Jaxheimer | 340/151 R |

*Primary Examiner*—Harold I. Pitts

*Attorney*—Brumbaugh, Graves, Donohue & Raymond

[57] ABSTRACT

A system adapted for connection to a polyphase power distribution network to interrogate a plurality of separate watt meters and store respective readings from the watt meters. The system comprises a central control unit coupled to the power distribution network for storing a plurality of separate meter identification codes each including a group of binary coded bits and means for serially sending the bits including means for modulating a signal on said power distribution network of fixed time duration and indicative of the binary state of each bit of said group. A plurality of meter transponder units are each coupled respectively to the plurality of watt meters for demodulating the signal impressed on the power distribution network and identifying the transmitted group of binary codes bits as its own predetermined identity code.

In one embodiment of the invention, the transmitted identity code is sequentially stored in a register and a variable strobe logic unit is provided for entering each received bit into this register at a time dependent upon the maximum delay of a particular power distribution network. The strobe logic includes means for determining the time difference between the receipt of the beginning of the bit over the shortest path, and the termination of the same transmitted bit over the maximum path. In a preferred embodiment, the strobe logic also includes means for strobing the bit of data at about the middle of the determined time difference, and means for preventing the subsequent bit from being strobed until after the determined time difference has elapsed, thus preventing an erroneous bit sensing due to system delay variations. Similar strobe logic can also be provided to compensate for system delay variations when transmitting the binary coded reading from the identified transponder unit to the central control unit.

28 Claims, 8 Drawing Figures

INVENTORS
William H Rood, Joe F. Lusk
BY Herbert L. Feldman
Wolf, Greenfield + Sacks INVENTOR
William H Rood, Joe F. Lusk & Herbert L Feldman
BY Wolf Greenfield & Sacks INVENTORS
William H. Rood, Joe J. Lusk
BY Herbert L. Feldman
Wolf Greenfield & Sacks INVENTORS
William H Rood, Joe J Luck &
BY Herbert L Feldman
Wolf, Greenfield & Sacks INVENTORS
William H. Rood, Joe F. Lusk
BY Herbert L. Feldman
Wolf, Greenfield & Sacks INVENTORS
William H Rood, Joe F. Lusk
BY Herbert L. Feldman
Wolf, Greenfield & Sacks

METER INTERROGATION SYSTEM HAVING STROBE LOGIC CONTROL

This is a continuation of application Ser. No. 53,623 filed July 9, 1970.

BACKGROUND OF THE INVENTION

The present invention relates in general to a control system including a central control unit coupled to a plurality of transponder units over a communication link for interrogating these transponder units sequentially. The system is preferably adapted for connection to a power distribution network to sequentially interrogate a plurality of watt meters and store respective readings from these watt meters. More specifically, the invention relates to a watt meter interrogation system that includes variable strobe logic means responsive to the maximum system delay of a multipath power distribution network for allowing a subsequent bit of a group of bits to be strobed but only after the termination of the previous bit transmitted over the maximum path.

In the past, the reading of household and commercial watt meters was accomplished by having a person, employed by the power company to visually read each individual meter. This procedure was quite time consuming and relatively expensive, and did not easily prevent the erroneous reading of a meter. Also, this visible reading technique did not quickly detect a faulty meter condition. In an effort to remedy some of these problems, automatic meter reading techniques were developed using either the power networks themselves or telephone lines, for example, as the communication medium. The use of telephone lines was undesirable from a practical standpoint in that such means of communication was not always conveniently available. A communication system including the power lines was of course available at each watt meter but the multiplicity of paths of varying length inherent with a conventional power distribution network provided variable system delays which were not taken into account when transmitting information over the network. These variable system delays always included a delay path of maximum value for the longest delay route. However, this maximum delay path would vary depending, at least in part, on temperature fluctuations and more importantly on the switching on and off of preselected network transformers as power consumption requirements changed.

Accordingly, it is one important object of the present invention to provide an improved system for connection to a polyphase power distribution network to interrogate a plurality of separate watt meters and store respective readings from these watt meters.

It is another important object of the present invention to provide a system according to the preceeding object that includes a central control unit connected to the power network for storing a plurality of groups of binary coded bits each group defining a meter identification code, and means for serially transmitting the bits including means for modulating a signal on the power network.

It is a further object of the present invention to provide a system according to the preceeding objects that further includes a plurality of meter transponder units each coupled to a watt meter for demodulating the signal impressed on the power network and identifying the transmitted group of binary coded bits as its own predetermined identity code.

It is still a further object of the present invention to provide a system according to the preceeding objects wherein the transponder unit includes a storage register for storing the meter identification code and a storage register for continuously storing the meter reading.

Another object of the present invention is to provide a system according to the preceeding objects wherein each meter transponder unit includes variable strobe logic for entering each received bit into its meter identification code storage register at a time dependent upon the maximum delay path of the power network.

A further object of the present invention is to provide a system according to the preceeding objects wherein the central control unit includes a memory means for storing a transmitted meter reading code, and variable strobe logic for entering each received bit of said meter reading into said memory means at a time dependent upon the maximum delay path of the power network.

SUMMARY OF THE INVENTION

According to the invention, a system is provided for sequentially interrogating a plurality of transponder units to determine the readings stored therein. The system comprises a central control unit which is adapted to store a plurality of separate meter identification codes each including a group of binary coded bits, and a plurality of remote meter transponder units adapted to receive a transmitted meter identification code, identify its own predetermined code and send its meter reading back to the central control unit.

In one embodiment of the invention, the meter identity code is transmitted serially over the power network by modulating a high frequency signal of fixed duration, indicative of a fixed bit time, on the conventional 60 cycle line. In one illustrative example a 900 cycle signal was used to indicate a binary ZERO and a 1,100 cycle signal to indicate a binary ONE. This modulation technique was used for transmitting both meter identification codes and meter reading codes over the power distribution network.

According to one aspect of the present invention, a storage register is provided for containing the transmitted meter identity code. Variable strobe logic is also provided in each transponder unit for entering each received bit into the storage register at a time dependent upon the maximum delay of a particular power distribution network. This strobe logic may include means for determining the time difference between the receipt of the beginning of the bit over the shortest path, and the termination of the same transmitted bit over the maximum path. The variable strobe logic may also include means for strobing the bits of each identification code at about the middle of the determined time difference and means for preventing the subsequent bit from being strobed until after the determined time difference.

According to another aspect of the present invention a variable strobe logic means may also be provided in the central control unit to compensate for changes in maximum system delay. In this case the central control unit would include storage means for sequentially receiving the transmitted meter reading code, and the variable strobe logic means would operate as discussed above with respect to each transponder unit.

Numerous other objects and features of the present invention should now become apparent upon a reading of the following detailed description in conjunction with the accompanying drawings in which:

DETAILED DESCRIPTION

Figures 1, 4:
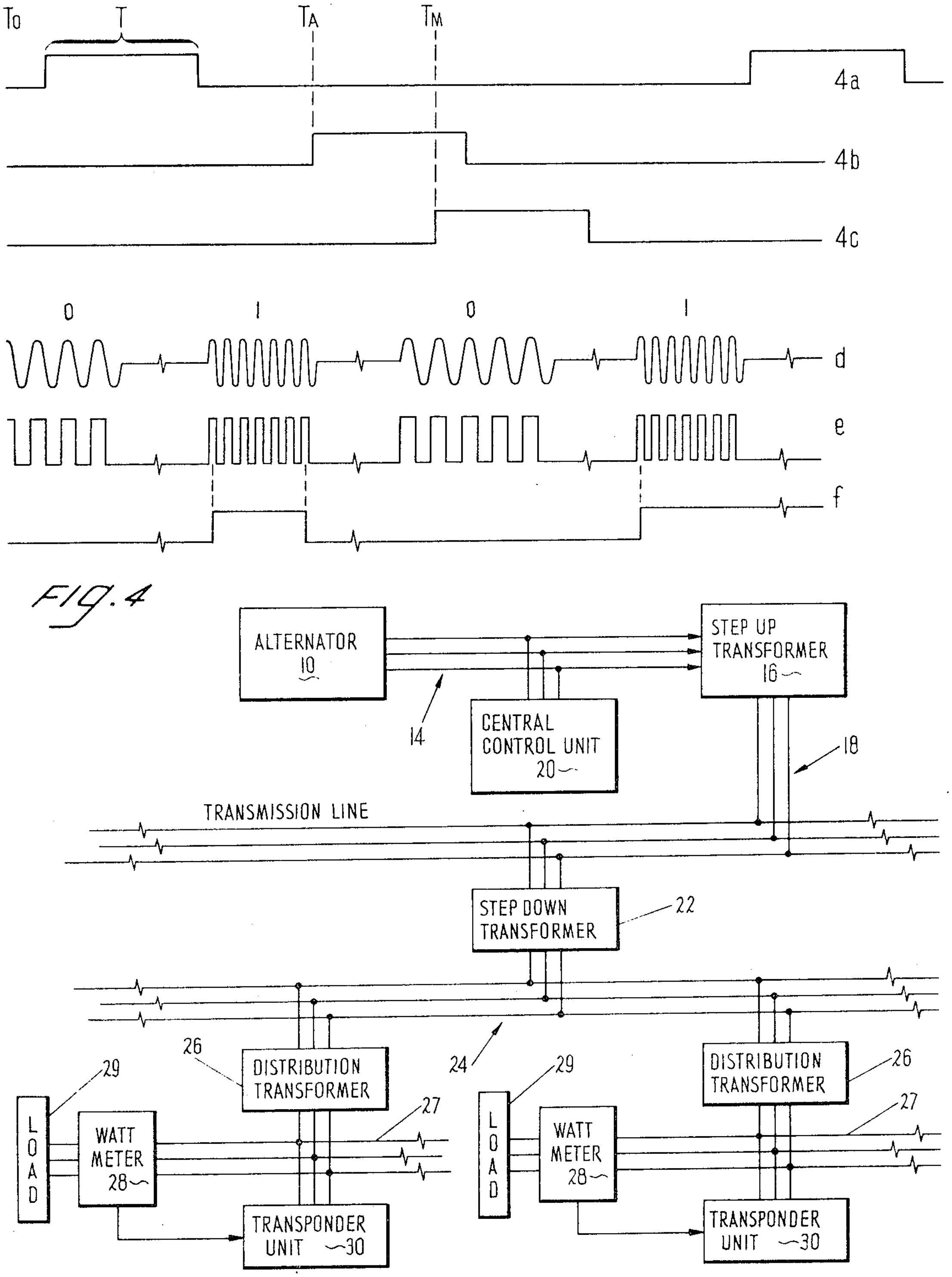
FIG. 1 is a block diagram of a power distribution network showing a central control unit and transponder units.
FIG. 4 shows timing diagrams indicating data transfer along the power network and waveforms from various circuits in either the central unit or transponder unit showing portions of each bit interval.

Referring now to FIG. 1, there is shown a part of a typical power distribution network including alternator 10 which is usually of conventional design and is adapted to generate a three phase voltage of 13,800 volts, for example, on three wire line 14. A step up transformer 16 is shown connected between line 14 and high voltage three wire transmission line 18. Transformer 18 is adapted to increase the three phase voltage from 13,800 volts on line 14 to 138,000 volts on line 18, for example. In one embodiment, central control unit 20 couples to three phase line 14 and is adapted to include a computer or other data storage unit for storing meter identity codes and meter reading codes, preferably in binary form. A complete power distribution network may include a number of alternators 10 and transformers 16.

In order to distribute the three phase power from transmission line 18 a number of step down transformers 22 are coupled to line 18, only one of which is shown in FIG. 1. These transformers 22 are sometimes referred to as substations in the system. Step down transformer 22 decreases the voltage from 138,000 volts on line 18 to 13,800 volts on line three wire 24. The output of each transformer 22 couples in turn by way of three phase line 24 to a number of distribution transformers 26, two of which are shown in FIG. 1. Transformers 16, 22 and 26 may all be of conventional design.

Figure 5:
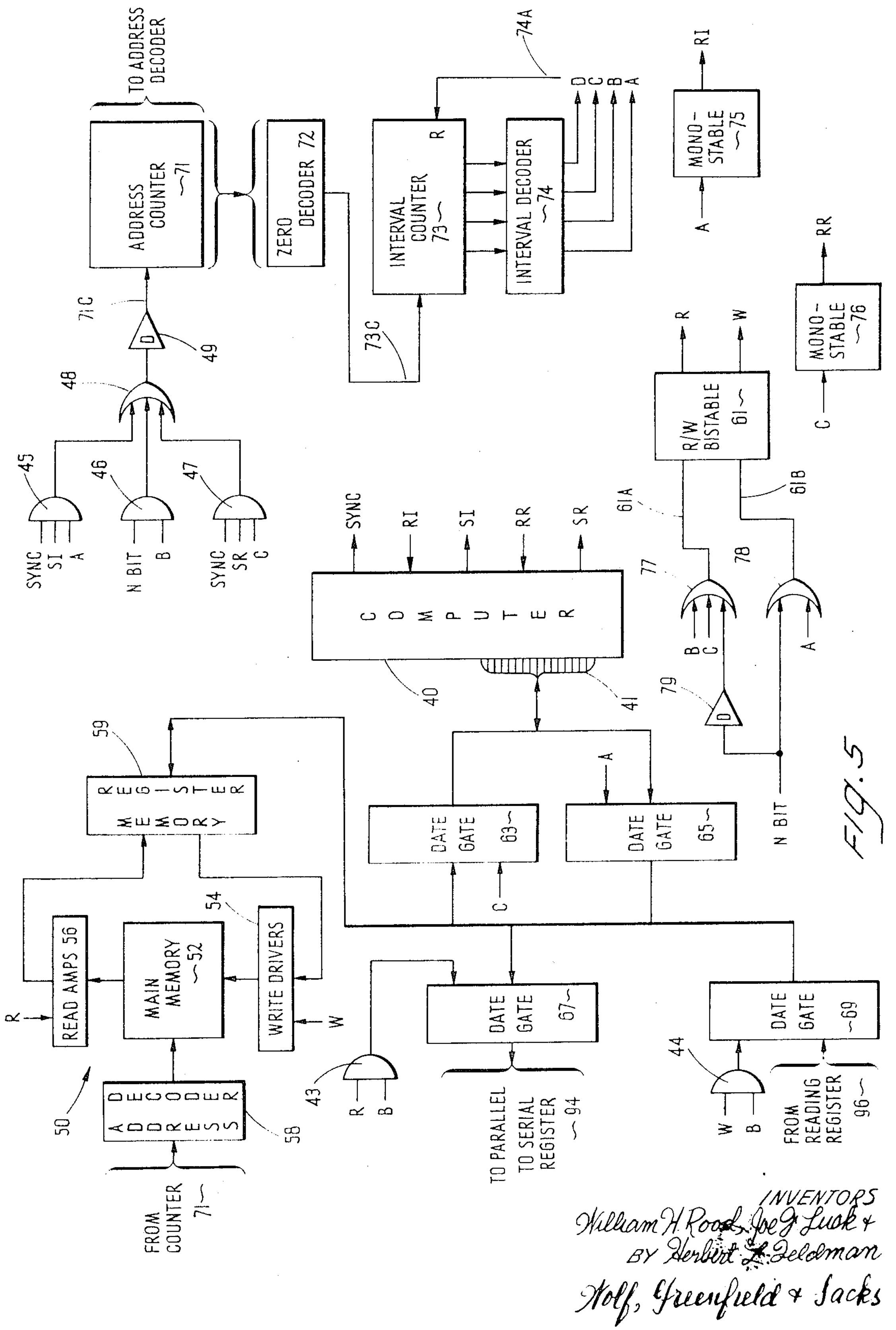
FIG. 5 shows in somewhat more detail a part of the central control unit including the computer, memory storage means, gating means and interval defining means.
Figure 6:
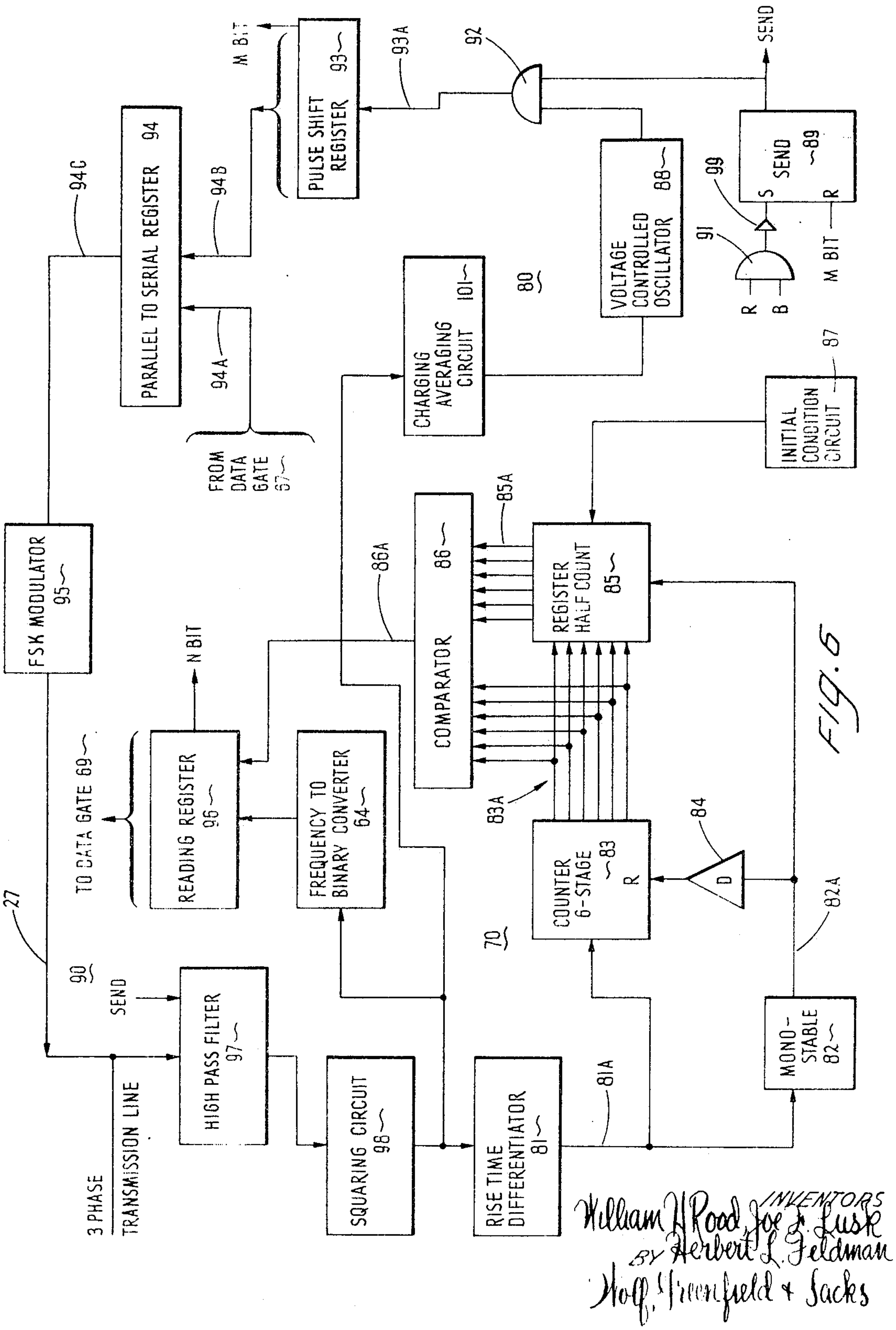
FIG. 6 shows in somewhat more detail the remainder of the central control unit including the variable strobe logic means, modem, and feedback control unit.
Figure 7:
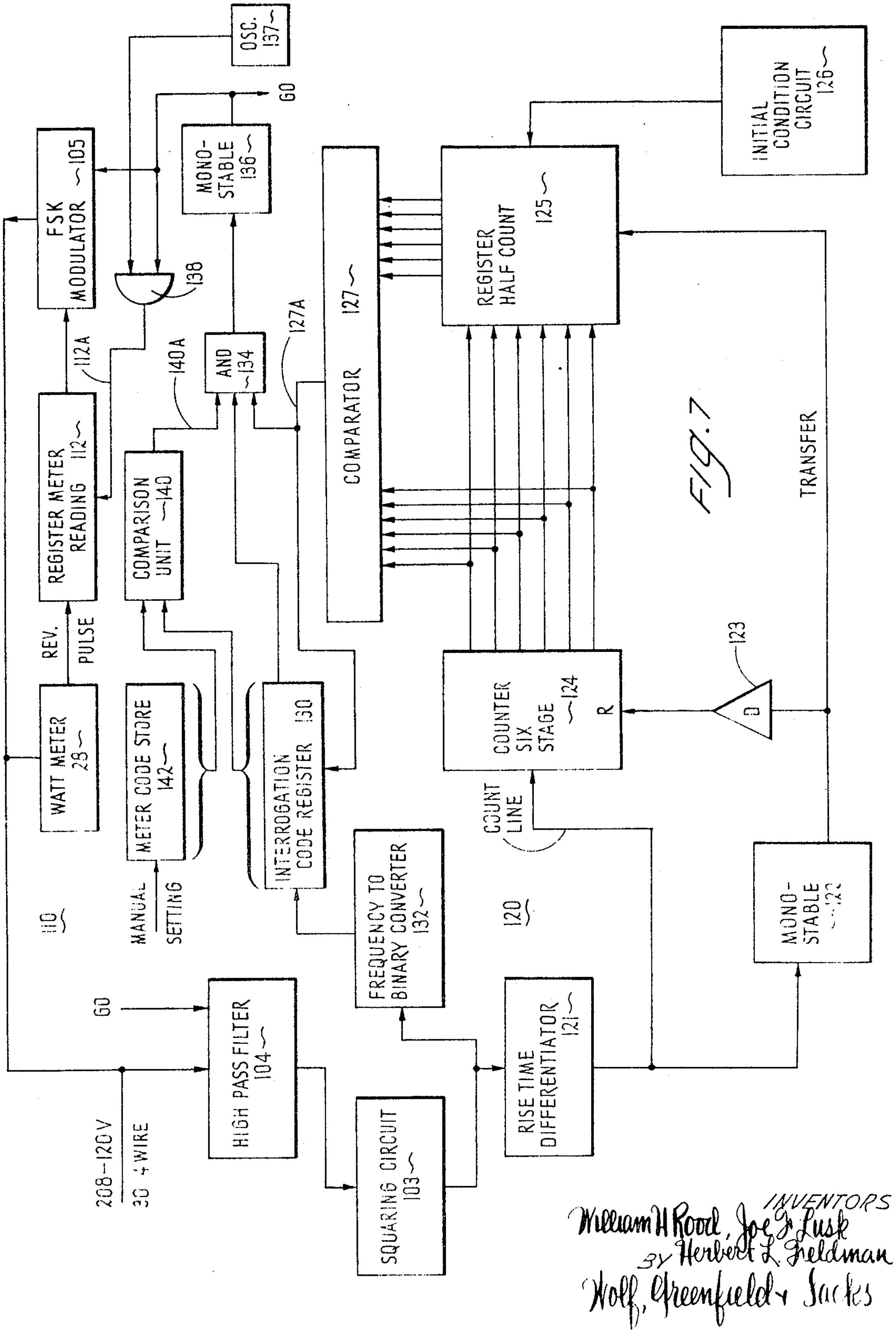
FIG. 7 is a block diagram in detail of a typical transponder unit according to the invention.

Distribution transformer 26 is provided to lower the voltage on line 24 to a value that is typical for consumer use such as either 120 volts or 220 volts. The three phase, three or four wire output line 27 from each transformer 26 couples to a number of household or commercial watt meters 28. Each of these watt meters 28 couple between line 27 and the electrical load 29 and are adapted to continuously indicate kilowatt consumption. A transponder unit 30 is also coupled to the line 27 and each watt meter 28, and is adapted to receive meter identity codes over line 27, identify its own predetermined meter identity code, store a meter reading code, and send such meter reading code to central control unit 20 when requested. Watt meter 28 is preferably of conventional design and typically includes a revolving disc from which a revolution pulse, may be generated. A preferred embodiment for central control unit 20 is shown in FIGS. 5 and 6, while a preferred embodiment for transponder unit 30 is shown in FIG. 7.

Figures 2, 8:
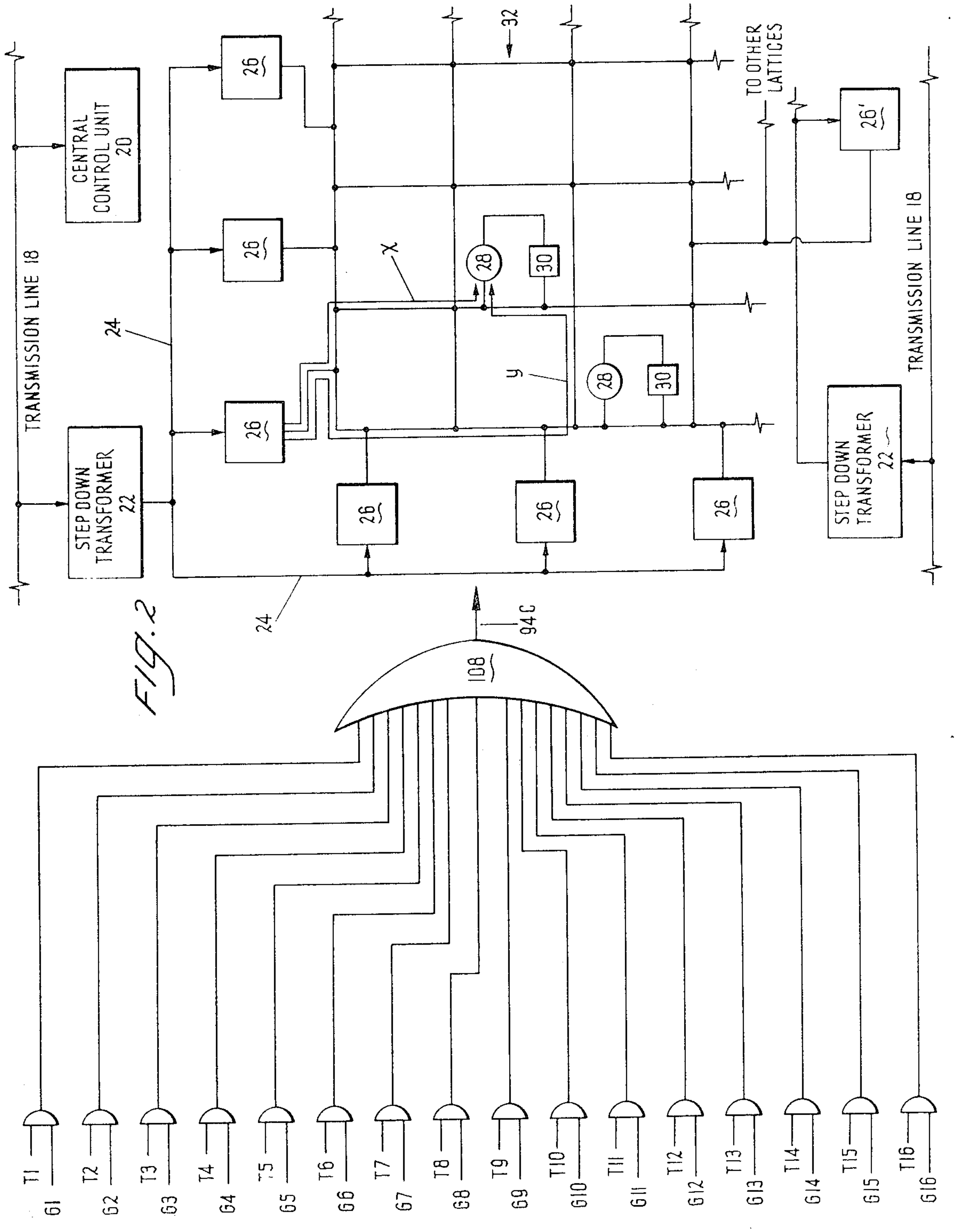
FIG. 2 illustrates partially in block form the multiple path problem associated with a typical power distribution network.
FIG. 8 is a logic diagram of the parallel to serial register shown in FIG. 6.

As previously mentioned, one of the problems encountered in transmitting and receiving data from central control unit 20 is that a multiplicity of power distribution network paths exist between unit 20 and any one transponder unit 30. FIG. 2 schematically shows a portion of a power distribution network including power distribution lattice 32. The power distribution lines are shown schematically as a single line in order to simplify the diagram. For the embodiment of FIG. 2 central control unit 20 couples directly to line 18 instead of to line 14 as indicated in FIG. 1. The step down transformer 22 couples between high voltage transmission line 18 and distribution line 24 which feeds a plurality of distribution transformers 26. In FIG. 2, a separate transformer 22', and distribution transformer 26' are shown coupled to transmission line 18. Transformer 26' may couple to other network lattices also. The maximum delay path is directly effected by the switching on or off of transformers 26 or 26'.

FIG. 2 shows just two of the many paths that couple the central control unit 20 to one of the transponder units 30. Only two of the many transponder units 30 are shown. The shorter of the two paths is designated as the *x* path, while the longer is designated as the *y* path. However, due to the different lengths of all possible routes, the delay time will vary from route to route. For any one system controlled by a single central control unit 20, a maximum path exists at any one time, which path is subject to change when different transformers are switched into and out of the network.

In FIG. 2 the transformers 22 and 22' may be conventional Y-Δ transformers. The transformers 26 and 26' may also be of conventional design, such as Y-Δ transformers adapted to supply typical 220 or 120 three phase voltages on a four wire transmission line. The meters 28 may also be conventional household or commercial watt meters.

FIG. 4 shows a timing diagram that indicates the initially transmitted bit of a complete code and the bits received at a transponder unit from different paths. FIG. 4*a* represents a bit of data, transmitted from central control unit 20 by modulating a high frequency signal on the transmission line. This bit of data commences at time $T_O$ and has a duration of T. This modulated data is transmitted over the power line and received first at time $T_A$ at the interrogated transponder unit 30. This data bit should also have a duration of time T, and is shown in FIG. 4b. The data bit transmitted over the maximum path is received at time $T_M$ and is shown in FIG. 4*c*. It is noted in FIG. 4*a* that the next data bit is not sent until after the trailing end of the maximum data bit from the previous transmission. In FIGS. 4*a*, 4*b* and 4*c* a square wave is depicted to illustrate each bit time. The actual modulated signal would be time varying during the bit time T.

Figure 3:
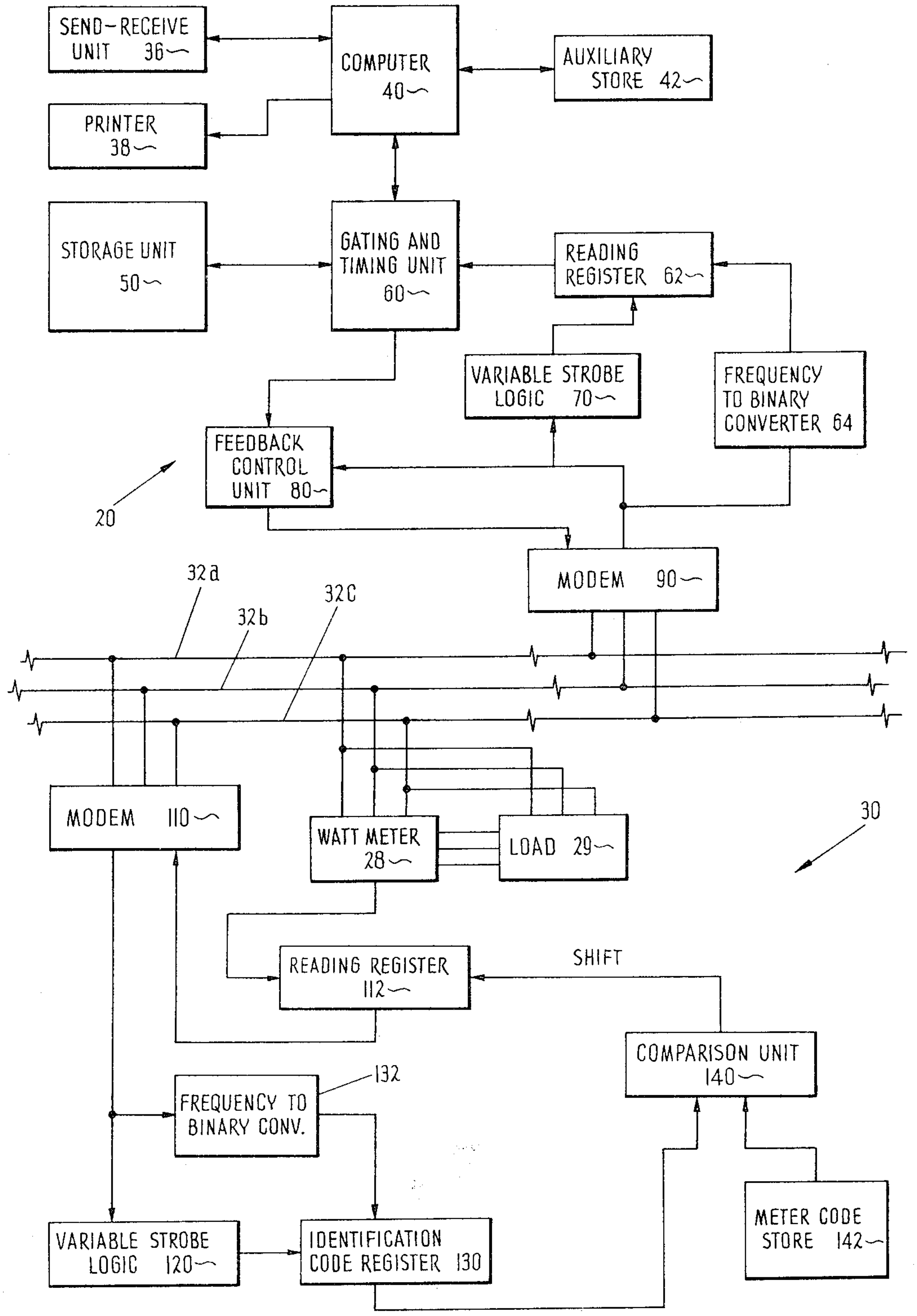
FIG. 3 is a block diagram showing the general parts that make up a central control unit and a transponder unit.

Referring now to FIG. 3 there is shown a block diagram of a typical central control unit and transponder unit constructed in accordance with the principles of the present invention. Both the central control unit 20 and transponder unit 30 are coupled to a conventional three phase power transmission line indicated by the three wires *32a*, *32b*, *32c*. The transmission line may physically include four wires where the fourth wire is a ground return wire.

The central control unit 20 includes in its general organization computer or data processing unit 40, gating and timing unit 60, storage unit 50, variable strobe logic unit 70, feedback control unit 80, and modem 90. Computer 40 is preferably a conventional general purpose computer which is adapted to store both meter identification codes and associates meter reading codes, and includes output means for coupling to certain peripheral units. These peripheral units are shown in FIG. 3 as including a send/receive unit 36 which may be a conventional teletype machine, and a printer 38 which is preferably a high speed printer. Printer 38 may be a typical impact printer or an electrostatic non-impact printer, for example. Auxiliary store 42 may be a conventional magnetic tape unit or, alternatively could be a magnetic disk file or optical storage unit. These peripheral units are adapted to send, receive, print or store meter readings and/or meter identification codes. Certain priorities can be programmed into computer 40 to determine when each unit is used and also when meter identification codes are to be sent to storage unit 50.

Gating and timing unit 60 includes a plurality of separate logic gates and timing circuitry for controlling data transfer. The timing circuit of unit 60 defines three basic time intervals; (1) when a plurality of meter identification codes are being sent to storage unit 50; (2) when each identification code is being transmitted and its corresponding reading code received and stored; and (3) when the plurality of meter reading codes are transmitted back to computer 40. Storage unit 50 may be a conventional core memory or sonic delay line memory. Appropriate read/write circuitry would be included as part of unit 50, as would an address register and data output register. FIG. 5 shows one embodiment for storage unit 50.

Central control unit 20 shown in FIG. 3 also includes feedback control unit 80 which is adapted to allow transmission of an identification code, one bit at a time, to modem 90. Unit 80 also includes a third (input) line from modem 90 which controls the rate at which each data bit is sent out, dependent upon the maximum path encountered by the data received by way of modem 90. One embodiment for feedback control unit 80 is shown and discussed in more detail with reference to FIG. 6.

Modem 90 may comprise an FSK (frequency shift keying) modulator, high pass filter and squaring circuit. In a preferred embodiment the modulator is adapted to convert a binary ONE/ZERO signal into a high frequency signal modulated on the power transmission line. To represent a ONE bit of an identification code, for example, a 1,100 cycle signal of predetermined time duration (bit time) would be modulated on the power line. Alternatively, to represent a ZERO bit of an identification code, a 900 cycle signal would be similarly modulated on the power line. A dwell time would be provided between each bit time. The high pass filter of modem 90 would pass only high frequency signals, and would have a relatively constant gain in the frequency range from 800–1,200 cycles, for example. The squaring circuit could be a conventional half wave rectifier circuit that would generate a squared half-wave output signal. One embodiment of modem 90 is shown in FIG. 6.

Frequency to binary converter 64 is coupled from an output of modem 90 to an input of reading register 62. Converter 64 may include a counting means and binary storage means, for example, and is adapted to convert the detected 900 or 100 cycle signal from modem 90 into a binary level. FIGS. *4d*, *4e* and *4f* show the high frequency signals from the high pass filter, the squared signals and the corresponding binary level signal, respectively for a 0101 bit pattern. The received meter identification code is sequentially stored in reading register 62, and variable strobe logic unit 70 is provided for entering each received bit into register 62 at a time dependent upon the maximum delay of a particular power distribution network. Variable strobe logic unit 70 includes means for determining the time difference between the receipt of the beginning of the bit (commencement of high frequency signal) over the shortest path, and the termination of the same transmitted bit over the maximum path. In a preferred embodiment variable strobe logic unit 70 also includes means for strobing the binary converted bit of data at about the middle of the determined time difference, and means for preventing the subsequent binary converted bit of data from being strobed until after the determined time difference has elapsed, thus preventing an erroneous bit sensing due to system delay variations.

Referring now to transponder unit 30 there is shown a modem 110, watt meter 28, variable strobe logic 120, identification code register 130, reading register 112, comparison unit 140 and meter code store 142. Modem 110 is similar in design to modem 90 and includes a modulator for interpreting a binary bit as either a ONE or ZERO and modulating the appropriate 900 or 1,100 cycle signal on the transmission line. Modem 110 also includes a high pass filter and squaring circuit for interpreting the received meter identification code. Watt meter 28 may be a conventional household or commercial meter and is coupled to a load 29 and the power transmission line. Watt meter 28 is adapted to generate a revolution pulse on the output line that connects to reading register 112. The rate at which pulses are transmitted on this output line is in direct relationship to the kilowatt consumption of the corresponding load 29.

Variable strobe logic unit 120 of unit 30 may be substantially identical to logic unit 70 of unit 20. The transmitted identity code is sequentially stored in identification code register 130 and variable strobe logic unit 120 includes a strobe output for entering each received bit into register 130 at a time dependent upon the maximum delay of a particular power distribution network. Variable strobe logic unit 120 may include the same means as variable strobe logic unit 70.

Frequency to binary converter 132 changes the pulsed output from modem 110 to a binary level code. It is the binary level representative of each bit that is strobed by the output from logic unit 120 to enter the bit of data at the appropriate time into register 130.

Meter code store 142 contains a fixed binary code. Each store 142 in each transponder unit 30 contains a different code that identifies its unit 30 and associated watt meter. The output from store 142 and register 130 are coupled to comparison unit 140. When the codes in store 142 and register 130 are identical, comparison unit 140 generates an output, thereby indicating that that transponder unit has been interrogated. The output from unit 140 is coupled to reading register 112 which contains a binary code representative of and corresponding to kilowatt consumption. Thus, the output of comparison unit 140 shifts the contents of register 112 to modem 110. This shift may occur at a predetermined rate or at a rate determined at least in part by the maximum path of the data received by transponder unit 30. Modem 110 includes means for sensing the binary state of each bit and sending the appropriate high frequency modulated signal on the power transmission line. Transponder unit 30 is shown in more detail in FIG. 7.

Referring now to FIG. 5, there is shown a portion of central control unit 20 including storage means 50, computer 40 and gating and timing logic. Storage means 50 is depicted as including main memory 52, write drivers 54, read amplifiers 56, address decoder 58 and memory output register 59. Storage means 50 may be of conventional design wherein main memory 52 is a magnetic core array and address decoder 58 is either a diode matrix decoder or a logic gate decoder. A read/write cycle is typical in most memory stores for reading information out of memory and writing information therein. Write drivers 54 are adapted for writing data into main memory 52 under control of the W output from read/write (R/W) bistable 61. Similarly, read amplifiers 56 are adapted for reading data from main memory 52 under control of the R output from bistable 61. Memory output register 59 contains either identification or reading codes that are either read from or written into main memory 52.

In FIG. 5 computer 40 illustratively includes an input/output section that is adapted to send and receive control commands and data. Computer 40 has three output commands; (1) a SYNC command; (2) a SENDING IDENTIFICATION CODE ST) command; and (3) a SENDING READINGS CODE (SR) command. Computer 40 also receives two input commands from the timing logic of central control unit 20. These commands are (1) REQUEST IDENTIFICATION CODES (RI); and (2) REQUEST READING CODES (RR). A plurality of data transfer lines 41 are also coupled from computer 40 to transfer gates 63 and 65.

FIG. 5 shows, in addition to computer 40 and storage unit 50, timing logic for defining the individual timing intervals associated with central control unit 20. This timing logic includes address counter 71, interval counter 73, bistable 61 and data gates 63, 65, 67 and 69. In the embodiment shown interval counter 73 may be a two stage counter which typically counts from 0 to 3 BCD (binary coded decimal). Two conventional flip-flops could be used and would be connected in a known manner to provide a counter that would increase its count every time a pulse is received on input count line 73C. Interval decoder 74 couples from the output of interval counter 73 and is adapted to decode each of the four different states of counter 73. The four output lines that couple between counter 73 and decoder 74 may connect to the two bistable outputs of the two flip-flops of counter 73, respectively. The four states of counter 73 are decoded by decoder 74 as intervals A, B, C and D. During interval A meter identification codes are transmitted from computer 40 to main memory 52. During interval B the identification codes are sent, one at a time, to a transponder unit and a reading therefrom is stored in main memory 52. During interval C a stored group of meter reading codes are transmitted from main memory 52 to computer 40. The decode of interval D is only temporary and is used to generate a reset signal via line 74A which reverts counter 73 to its A state. Interval decoder 74 may be a conventional AND gate decoder, or the like.

Address counter 71 is adapted to count from 0 to 4,095 (4,096 total counts) in the embodiment illustrated, and may be of conventional design including twelve flip-flops ($2^{12}$ equals 4,096) for providing the necessary counts. One output from counter 71, which actually comprises a plurality of output lines each coupled from one of the flip-flops of counter 71, is coupled to address decoder 58. Address decoder 58 interprets the count in counter 71 and selects one of the addresses (locations) in main memory 52 to which data is either written into or read from. The second output from counter 71 also comprises a plurality of output lines each coupled from one of the flip-flops of counter 71 and is coupled to decoder 72 which is adapted to decode (sense) the 0 position of counter 71. Decoder 72 may also be a conventional AND gate decoder. Each time counter 71 has counted 0 to 4,095 and decoder 72 senses the zero count, a count pulse is generated on line 73C which connects to interval counter 73.

The sequential advancement of counter 71 is accomplished by count pulses generated on input count line 71C from the count logic. This count logic includes AND gates 45, 46 and 47, OR gate 48 and delay network 49. The AND gate 45 is enabled when a computer SYNC pulse is received, when computer 40 also generates an SI command, and when the interval counter 73 is in the A state. Thus, when the system is in the A state, computer 40 is transmitting identification codes over data lines 41 and gate 45 passes a pulse when the SI and SYNC commands are concurrently present. This output pulse from AND gate 45 enables OR gate 48, is delayed by delay network 49 and is coupled by count line 71C to counter 71. Delay network 49 is provided to insure that the address counter 71 changes count only after the identification code has had sufficient time to be entered into main memory 52. The other AND gates 46 and 47 are provided to advance counter 71 during the B and C intervals, respectively. The N BIT signal is generated from reading register 96, shown in FIG. 6, during interval B after the identification code has been transmitted over the power line and the last bit (N BIT) of the reading code has been received. The output of AND gate 46 also enables OR gate 48 and pulses counter 71 to its next count. During interval C the reading codes stored in main memory 52 are transmitted to computer 40 when computer 40 generates a SYNC and SR command. This also enables OR gate 48 and advances counter 71.

Monostable multivibrators 75 and 76 are adapted to generate the RI and RR request signals, respectively, which are coupled to computer 40. When decoder 74 senses the commencement of the A interval monostable multivibrator 75 reverts to its high state for a predetermined interval and the RI command goes high. Computer 40 then knows that central control unit 20 has finished transmitting meter reading codes and is ready to receive identification codes. Subsequently, when decoder 74 senses the commencement of the C interval monostable multivibrator 76 reverts to its high state for a predetermined interval and the RR command goes high. Computer 40 then knows that central control unit 20 has transmitted all of its identification codes to transponder units 30, received corresponding reading codes therefrom, and is ready to send these reading codes to computer 40.

In FIG. 5 R/W bistable 61 controls the reading from and writing into main memory 52, and also controls the data flow via data gates 67 and 69. Bistable 61 may be a conventional flip-flop wherein an input signal on line 61A makes the R output go high, and an input signal on line 61B makes the W output go high. The OR gates 77 and 78 have their outputs coupled, respectively, to input lines 61A and 61B. During the A interval OR gate 78 is enabled, line 61B is high and bistable 61 is in its W (write) state thereby enabling write drivers 54 and allowing identification codes to enter main memory 52. The data path is from data lines 41 of computer 40, by way of data gate 65 which is enabled only during interval A, over data bus 66, and into memory register 59. The data in register 59 at any one time is either written into or read from the address selected by address decoder 58. During interval A when W is high the write drivers 54 are activated and the identification codes are written into main memory 52. These codes are transmitted from computer 40 at the SYNC pulse rate and address counter 71 steps to the next address (see gate 45) only after the data has been written.

During the B interval an identification code is serially transmitted, a reading code is serially received and the next identification code is transmitted. This sequence continues until all identification codes have been sent and corresponding readings received. It is during this interval that the variable strobe logic units are activated to control the time of reception of each bit of a code, which time is dependent upon the maximum delay path of a network at any given time.

The OR gate 77 has a B interval input that enables gate 77, switches line 61A high and sets bistable 61 to its R (read) state. This action enables read amplifiers 56 and AND gate 43 and allows an identification code to flow in parallel through register 59, over data bus 66, and by way of enabled data gate 67 to parallel to serial register 94, shown in FIG. 6 and discussed hereafter. When reading register 96 receives the last bit of the corresponding reading code N BIT goes high, OR gate 78 is enabled and bistable 61 switches to its W output. This action enables write drivers 54 and AND gate 44 and allows the reading code to pass from reading register 96, by way of data gate 69 and over data bus 66 to memory 50. The reading code is entered in the same address location as the identification code was in. Counter 71 is only incremented after the reading is entered.

Delay 79 is coupled between the N BIT input of FIG. 5 and one of the inputs of OR gate 77. The delay time of delay 79 is long enough to allow the meter reading code to be entered in memory 50 before bistable 61 reverts to its R state, so that the next identification code can be read from memory 50. Thus, the delayed N BIT signal enables gate 77, switches bistable 61 to its R state and enables read amplifiers 56 and data gate 67, via AND gate 43. This read/write sequence of bistable 61 continues until address counter 71 is back to its zero count and interval counter 73 moves to interval C. At that time all identification codes should have been sent and corresponding reading codes received from the transponder units 30.

During the C interval the stored reading codes are transmitted to computer 40 at a SYNC pulse rate. The C signal enables OR gate 77 which switches bistable 61 to its R state. This action enables read amplifiers 56 for the entire C interval, and also enables data gate 63. Data flow passes from memory 50, over data bus 66, through data gate 63, and to computer 40 over data lines 41. At the end of interval C interval decoder 74 switches temporarily to state D. This action generates a signal on line 74A which immediately reverts counter 73 to its A state.

Referring now to FIG. 6 there is shown the remainder of central control unit 20, including variable strobe logic unit 70, modem 90, and feedback control unit 80. The identification code in binary form is coupled from data gate 67 of FIG. 5 during interval B to parallel to serial register 94. Register 94 may be of conventional design and is adapted to receive identification data from gate 67 over line 94A, store this data, and shift the data out on line 94C under control of pulse shift register 93. One embodiment of register 94 is shown in FIG. 8.

In an illustrative embodiment of the invention each identification code comprises 16 bits and each reading code comprises 16 bits. The N BIT output, therefore, from reading register 96 would occur when the 16th bit of the reading code is detected. When transmitting an identification code, register 94 would have a capability of storing 16 bits of data and these 16 bits would be sequentially transmitted via line 94*c* to FSK modulator 95. Modulator 95 may include two oscillators for generating 900 and 1,100 cycle frequencies, gating means responsive to the state (ONE OR ZERO) of each bit for gating on the 900 cycle oscillator when a ZERO is indicated and gating on the 1,100 cycle oscillator when a ONE is indicated, and modulation means for sequentially modulating either the gated 900 or 1,100 cycle signal for a predetermined time on three phase transmission line 27.

One of the transponder units 30 will recognize its own identification code and will transmit its reading code serially a bit at a time to central control unit 20. This transmitted reading code is coupled by way of transmission line 27 to high pass filter 97 which passes the high frequency signals (900 or 1,100 cycle) and blocks the 60 cycle signal. A typical output from filter 97 is shown in FIG. 4d. The output of filter 97 is coupled to squaring circuit 98 which may include a half-wave rectifier and clipping circuit. The output of squaring circuit 98 is shown in FIG. 4*e* as a pulse train of either 900 or 1,100 cycle frequency. This output is coupled to variable strobe logic unit 70, feedback control unit 80, and to frequency to binary converter 64. Converter 64 typically may include two comparators with a 900 and 1,100 cycle clock coupled to each comparator. A binary ONE would be detected when one of the comparators is activated and a binary ZERO when the other is activated. The output of converter 64 is shown in FIG. 4f for an illustrative bit pattern of 0101. In FIG. 4*f* a dwell interval is provided between data bits during which time the signal may be considered as being at a reference level if ONE is illustratively shown as a positive level and a ZERO a negative level. Obviously, other schemes may be used to indicate ONE's and ZERO's. The output of converter 64 couples to reading register 96 and each data bit is strobed at the correct time by a pulse coupled over line 86A from comparator 86 of variable strobe logic unit 70.

Logic unit 70 comprises rise time differentiator 81, monostable 82, counter 83, register 85, initial condition circuit 87, and comparator 86. Let us assume that high pass filter 97 is about to receive a high frequency signal transmitted from a transponder unit over power line 27 via the shortest path between the interrogated transponder unit and central control unit 30. Differentiator 81, which may be a conventional circuit including an R-C network, detects the rising edge of each of the pulses (see FIG. 4*e*) from squaring circuit 98 and generates a narrow sharp count pulse on output line 81A. This output is coupled to the count input of counter 83 and to monostable multivibrator 82.

Counter 83 receives a count pulse by way of line 81A from differentiator 81 as long as filter 97 is detecting a high frequency signal. After the termination of the data bit that has passed over the maximum path, differentiator 81 detects no more pulses and thus, counter 83 has reached its maximum count. Monostable multivibrator 82 also receives count pulses via line 81A, and is adapted to change to its high state when a pulse is received and remains in that state as long as pulses continue to be received at the high frequency rate. Thus, monostable 82 actually measures the time difference between the receipt of the first pulse from differentiator 81 and the receipt of the last pulse over the maximum path from differentiator 81.

When monostable 82 reverts to its low state a signal is generated on output line 82A which is coupled to delay circuit 84 and register 85. Register 85 may be of conventional design and is adapted to have transferred thereto one-half the count in counter 83 when an output is generated on output line 82A. Delay network 84 is provided between output line 82A and counter 83 to delay the pulse on line 82A so that the transfer from counter 83 to register 85 can occur before counter 83 is reset. In FIG. 6, six output lines indicated at 83A are connected from counter 83 to register 85 and comparator 86. Comparator 86 also has six input lines indicated at 85A coupled from register 85. Thus, each time that a bit of data is received by central control unit 20, at the end of the bit interval as determined by monostable 82 one-half of the count in counter 83 is transferred to register 85. If the power network is stabilized and the maximum count for counter 83 stays constant, comparator 86 should generate an output on output line 86A at approximately the middle of the bit interval. For example, if counter 83 initially counted to 20 and a count of 10 is transferred to register 85, the subsequent bit of data is strobed when counter 83 reaches a count of 10. The binary data on lines 83A and 85A would then be identical and comparator 86 would generate an output strobe pulse on line 86A. This pulse strobes the date output from converter 64 into reading register 96 at the correct time.

Initial condition circuit 87 is provided to set up an initial count to register 85. Circuit 87 may be of conventional design and may include a set of switches that are manually operated for inserting a predetermined count into register 85. For example, register 85 may have a BCD (binary coded decimal) count of 10 inserted thereinto. Thus, when counter 83 reached a count of 10, comparator 86 would generate an output on line 86A to enter the particular bit of data into reading register 96. If counter 83 then proceeded to a count of 30, a count of 15 would be transferred to register 85 at the end of the bit interval. Then, the next bit of data would be strobed at the middle of the bit interval or at a count of 15. So it is always the previous bit interval that determines the strobe time for the following bit interval.

When the last bit of a reading code has been entered into register 96 an N BIT signal is generated. This signal enables bistable 61 in FIG. 5 and data gate 69 to allow the reading code from register 96 to pass over data bus 66 to memory 50 for storage therein.

FIG. 6 shows one illustrative embodiment of variable strobe logic unit 70. In other embodiments, different fractions of the count in counter 83 may be transferred to register 85, for example. Unit 70 includes a feedback responsive loop that is operative even when the phase of the high frequency signal varies so as to cause additional pulses to be sent to counter 83. However, after the first occurrence of these additional pulses, counter 83 and register 85 immediately compensate by varying the time at which comparator 86 generates a strobe output on line 86A.

FIG. 6 also shows feedback control circuit 80. Circuit 80 is primarily adapted for controlling the transmission of identification codes at a time dependent upon the rate at which data is received via squaring circuit 98 from the power network. As previously mentioned, the data to be transmitted is transferred by way of data gate 67 to parallel to serial register 94. A series of pulses are generated on line 94B from pulse shift register 93. Pulse shift register 93 may be of conventional design and is adapted to have a plurality of outputs which sequentially generate a series of pulses spaced at predetermined time intervals. When the last of the series of pulses occurs, register 93 generates an M BIT signal. Register 93 is free running and is started by an input signal coupled from AND gate 92 over line 93A.

AND gate 92 is enabled when a SEND signal is generated from SEND flip-flop 89. Flip-flop 89 controls the sending of data by way of FKS modulator 95, and is set when the R and B signals (see FIG. 5) are coupled to AND gate 91 via delay circuit 99 to the set input of flip-flop 89. Flip-flop 89 is reset by the M BIT signal. Delay circuit 99 is provided so that the SEND signal does not occur until the data has been transferred to register 94. At that time the SEND signal goes high and when a pulse is generated from the output of voltage control oscillator 88 AND gate 92 is enabled for the time duration of the pulse from oscillator 88.

Charge averaging circuit 101 is coupled from the output of squaring circuit 98 and is adapted to have a voltage output that is a direct function of the number of pulses received from squaring circuit 98 in a predetermined time interval, such as the interval between data bits of a code word. Charging averaging circuit 101 may be of conventional design and would include a capacitor charging circuit. The output of circuit 101 is coupled to voltage control oscillator 88 to control the pulse repetition rate of oscillator 88. Voltage controlled oscillator 88 may also be conventional and is designed to have an output pulse repetition rate that increases with decreasing voltage input. When an increased number of pulses are received from circuit 98 because the maximum delay path increased, for example, circuit 101 has a higher voltage output. Thus, the output repetition rate of oscillator 88 is slower and each bit of the identification code is transmitted at a slower rate. Alternatively, when the frequency from the squaring circuit 98 decreases the output of circuit 101 decreases and the repetition rate from oscillator 88 becomes faster.

The SEND signal from flip-flop 89, besides enabling AND gate 92 in allowing a shifting of pulses out of register 94, also inhibits high pass filter 97 during the time that the SEND output is high. This is necessary to prevent filter 97 from detecting the identification code when it should be detecting the reading code only.

Referring now to FIG. 8 there is shown one embodiment of register 94 shown in FIG. 6. Register 94 comprises 16 AND gates indicated at 107 and one OR gate 108. Each of the AND gates has an output coupled from pulse shift register 93 and a data output from data gate 67. These are labeled respectively as time interval inputs T1–T16 and gate or data inputs G1–G16. Thus, when pulse shift register 93 has its T1 output high, the data bit, ONE or ZERO, on line G1 is enabled and passes by way of OR gate 108 and line 94C to modulator 95 shown in FIG. 6. This sequence T1–T16 continues until the last bit is received. In FIG. 8, the T16 output itself would be the M BIT signal used in FIG. 6.

Referring now to FIG. 7, there is shown an illustrated embodiment of transponder unit 30 according to the invention. The general organization of the transponder unit 30 shown in FIG. 7 is quite similar to the part of central control unit 20 shown in FIG. 6. Transponder unit 30 includes in general a modem 110, watt meter 28, reading register 112, frequency to binary converter 132, variable strobe logic unit 120, and comparison unit 140.

Modem 110 includes high pass filter 104, modulator 105 and squaring circuit 103, all of which may be of conventional design and substantially the same as filter 97, modulator 95, and squaring circuit 98, shown in FIG. 6. The meter identification code transmitted from central control unit 20 is received over a conventional three phase transmission network coupled to high pass filter 104. The output from filter 104, squaring circuit 103 and frequency to binary converter 132 may be similar to that shown in FIGS. 4*d*, *e*, and *f*, respectively.

The binary output of converter 132 is coupled to interrogation code register 130. The output of the variable strobe logic unit 120 also couples to register 130 and generates a strobe pulse at the correct time to enter each bit of data from converter 132 into register 130. Unit 120 may be identical to variable strobe unit 70 of central control unit 20. Unit 120 includes a rise time differentiator 121 for differentiating the leading edge of each pulse from squaring circuit 103. Monostable 122 is coupled from the output of differentiator 121 and is adapted to be in its high or selected state for the time that a high frequency signal is being detected by filter 104. Logic unit 120 also includes counter 124, register 125 and initial condition circuit 126. The output of monostable 122 which occurs at the end of the selected state transfers one-half of the count from counter 124 to register 125, and by way of delay 123 resets counter 124. Comparator 127 is adapted to sense the varying output of counter 124 and the output of register 125. Comparator 127 may be identical to comparator 86 of unit 70 and is adapted to generate an output strobe pulse on line 127A which is coupled to AND gate 134 and interrogation code register 130. Comparator 127, counter 124 and register 125 provide the same type of system delay compensation for transponder unit 30 as their like blocks in unit 70 of control unit 20.

In one embodiment the interrogation code comprises 16 bits which are sequentially entered into register 130 which may be of conventional design. Transponder unit 30 also includes a meter identification code store 142 which may include a set of manually operated switches set to a predetermined code position that identifies a particular transponder unit. Comparison unit 140 has two inputs, one coupled from store 142 and the other from register 130. Each of these inputs to unit 40 comprises a plurality of separate data lines. When the output of store 142 and register 130 compare, bit for bit, comparator 140 generates an output signal on line 140A that is coupled to AND gate 134. AND gate 134 also has two other inputs, one from comparator 127 of variable strobe logic unit 120, and one from register 130. The input coupled from register 130 may be referred to as the N BIT received signal, meaning that the entire meter identification code has been entered into register 130. When all of the inputs to AND gate 130 are high the particular transponder unit has recognized its own identification code. The output of AND gate 134 couples to monostable 136. Monostable 136 may be referred to as the GO monostable which is adapted to have its selected state high for a time interval that is sufficient to send all of the bits of the reading code serially from meter reading register 112. The GO output from monostable 136 is also coupled to high pass filter 104 to inhibit its operation while meter reading codes are sent over the power network.

Transponder unit 30 also includes conventional oscillator 137 which is coupled along with the output of monostable 136 to AND gate 138. Oscillator 137 generates pulses at a predetermined rate depending upon the general organization of a particular power network. Where many long paths exist, the output of oscillator 137 would operate at a lower rate than where smaller or shorter paths exist. The output of AND gate 138 thus, is a series of sixteen pulses generated on line 112A that shift the reading in register 112 out by way of FSK modulator 105 to the transmission line. The output of monostable 136 may also enable modulator 105 to allow the reading to be sent thereby. Modulator 105 may be of conventional design and may be identical to modulator 95 shown in FIG. 6.

Having described one illustrative embodiment of the invention, other modifications and changes should become apparent to one skilled in the art. For example, one memory means has been shown for storing identification and reading codes. In another embodiment separate memory means could be used for identification and reading codes, respectively. Also, a somewhat simplified gating structure has been disclosed. In other embodiments, a gating structure could include register storage means so that two or more meter reading codes, for example, could be entered in one address of memory. Further, many variations of the variable strobe logic unit are contemplated as falling within the scope of the invention. For example, register 85 or 125 may be designed to accept fractions of a total count other than one-half.

Having described certain embodiments of the present invention, other embodiments and modifications thereof should become apparent to one skilled in the art. This invention should not be limited by the specific embodiments disclosed herein. Rather, the scope of the invention should be interpreted by and limited only by the claims.

What is claimed is:

1. A system adapted for connection to a communications link to interrogate a plurality of separate meters and store respective readings therefrom, comprising:
a central control unit coupled to the communications link;
and a plurality of transponder units each coupled to a meter and the communications link;
said central control unit comprising;
means for storing a plurality of meter identification codes, each of said codes comprising a plurality of bits,
and means for sequentially sending said meter identification codes to said plurality of transponder units including means for impressing a signal of predetermined duration on said communications link indicative of the state of each of said bits of said identification code,
each of said transponder units comprising:
means for storing each bit of a transmitted identification code,
means for identifying its own predetermined identification code,
means for registering the reading of said meter,
and means for transmitting a meter reading code to said central control unit,
said means for storing each bit of a transmitted identification code comprising demodulating means coupled from the communications link, an identification code store and strobe logic means having an output coupled to the identification code store,
said strobe logic means being responsive to the duration of each received bit of the identification code for generating an output pulse which enters each bit into the identification code store,
said strobe logic means including means for varying the time of occurrence of the output pulse from the strobe logic means depending upon the duration of the received bit signal which duration is in turn a function of the maximum delay path of the communications link.

2. A system as set forth in claim 1 wherein said communication link includes a multipath power distribution network.

3. A system as set forth in claim 1 wherein said central control unit comprises means for storing a meter reading code transmitted from each of said transponder units, comprising a meter reading store and second strobe logic means for entering each bit of said reading code into said meter reading store, said second strobe logic means including means for varying the time of occurrence of the output from said second strobe logic means depending upon the duration of the bit signal received from the transponder unit.

4. A system as set forth in claim 1 wherein said strobe logic means includes means for determining the time difference between the receipt of the beginning of each bit over the shortest path of the communication link and the termination of the same transmitted bit over the maximum path.

5. A system as set forth in claim 4 wherein said strobe logic means includes means for storing an indication of about the middle of the determined time difference and for strobing the next bit at that stored indication time.

6. A system as set forth in claim 5 wherein said strobe logic means includes means for preventing the next bit from being strobed until after the determined time difference.

7. A system adapted for connection to a communications link to interrogate a plurality of separate meters and store respective readings therefrom comprising:
a central control unit coupled to the communications link,
and a plurality of transponder units each coupled to a meter and the communications link,
said central control unit comprising,
means for storing a plurality of meter identification codes, each of said codes comprising a plurality of bits,
and means for sequentially sending said meter identification codes to said plurality of transponder units including means for impressing a signal of predetermined duration on said communications link indicative of the state of each of said bits of said identification code,
each of said transponder units comprising,
means for storing each bit of a transmitted identification code,
means for identifying its own predetermined identification code,
means for registering the reading of said meter,
and means for transmitting a meter reading code to said central control unit,
wherein said central control unit further comprises means for storing a meter reading code transmitted from each of said transponder units,
said means for storing a meter reading code comprising demodulating means coupled from the communications link, a meter code store and strobe logic means having an output coupled to the meter code store,
said strobe logic means being responsive to the duration of each received bit of the meter reading code for generating an output pulse which enters each bit into the meter code store,
said strobe logic means including means for varying the time of occurrence of the output pulse from the strobe logic means depending upon the duration of the received bit signal which duration is in turn a function of the maximum delay path of the communications link.

8. In a power distribution network having a multiplicity of transmission line paths coupled to a plurality of meters and a central control unit adapted to store and send meter identification codes, a plurality of transponder units each comprising:
means for storing and identifying its own predetermined identification code,
means for registering the reading of one of said meters,
means for transmitting a meter reading code to said central control unit,
said means for storing and identifying its own predetermined identification code comprising an identification code store and strobe means having an output coupled to the identification code store,
said strobe means being responsive to the duration of each received bit of the identification code for generating an output pulse which enters each bit into the identification code store, said strobe means including means for time varying the output pulse from the strobe means depending upon the duration of the received bit signal, and means coupled from said means for storing to said means for transmitting responsive to the duration of each bit received from the central control unit for varying the rate at which the bits of the meter reading code are transmitted.

9. A system as set forth in claim 4 wherein said means for determining the time difference includes a monostable multivibrator.

10. A system as set forth in claim 1 wherein said means for varying the time of occurrence of the output pulse includes a comparator having an output coupled to the strobe logic output, a differentiator at the input of said strobe logic means, a counter having an input coupled from the differentiator and having a plurality of outputs coupled to a first set of inputs of the comparator, a register having a plurality of outputs coupled to a second set of inputs of the comparator and a plurality of inputs coupled from the counter, and a monostable multivibrator for determining the time difference between the receipt of the beginning of each bit over the shortest path of the communications link and the termination of the said bit over the maximum path, said multivibrator having an output coupled to said counter for resetting the counter after the termination of the bit over the maximum path and an output coupled to the register for causing a transfer of a part of the count in the counter to the register prior to resetting of the register.

11. A system as set forth in claim 10 including an initial condition circuit coupled to the register for initially setting a preselected count into the register.

12. A system as set forth in claim 10 including delay means coupled between the multivibrator and the counter for delaying the resetting of the counter until after the part of the count therein has been transferred to the register.

13. A system as set forth in claim 10 wherein one-half the count is transferred from the counter to the register.

14. A system as set forth in claim 1 wherein said demodulating means includes a filter means, squaring circuit and frequency to binary converter.

15. A system as set forth in claim 3 including means located in said central control unit coupled from said means for storing a meter reading code to said means for sequentially sending said meter identification codes responsive to the duration of each bit received from the transponder unit for varying the rate at which the bits of the meter identification code are transmitted.

16. A system as set forth in claim 15 wherein said central control unit includes demodulating means.

17. A system as set forth in claim 16 wherein said means for sequentially sending said meter identification codes includes a parallel to serial register, and said means for storing a plurality of meter identification codes includes a storage memory and means for transferring data into and out of said storage memory.

18. A system as set forth in claim 17 wherein said means for varying the rate at which the bits of the meter identification code is transmitted includes a charging circuit coupled from the demodulating means of the central control unit, a voltage controlled oscillator coupled from the charging circuit, and a shift register having an input coupled from the voltage controlled oscillator and a plurality of outputs coupled to the parallel to serial register for controlling the serial transmission of data bits from the parallel to serial register.

19. A system as set forth in claim 18 wherein the parallel to serial register includes a plurality of AND gates and an OR gate.

20. A system as set forth in claim 1 wherein said central control unit comprises a computer, and control means for transferring identification codes from said computer to said means for storing a plurality of meter identification codes during a first time interval and for transferring meter reading codes to said computer during a second time interval.

21. A system as set forth in claim 1 wherein said transponder unit comprises means coupled from said means for storing each bit of a transmitted identification code to said means for transmitting a meter reading code responsive to the duration of each bit received from the central control unit for varying the rate at which the bits of the meter reading code are transmitted.

22. A system as set forth in claim 7 wherein said transponder unit comprises an identification code store and strobe logic means for entering each bit of the identification code into said identification code store, said strobe logic means of said transponder unit including means for varying the time of occurrence of the output from the said strobe logic means of said transponder depending upon the duration of the bit signal received from the central control unit.

23. A system as set forth in claim 7 wherein said strobe logic means includes means for determining the time difference between the receipt of the beginning of each bit over the shortest path of the communication link and the termination of the same transmitted bit over the maximum path.

24. A system as set forth in claim 23 wherein said strobe logic means includes means for storing an indication of about the middle of the determined time difference and for strobing the subsequent bit at that stored indication time.

25. A system as set forth in claim 7 wherein said central control unit includes means coupled from said means for storing a meter reading code to said means for sequentially sending said meter identification code responsive to the duration of each bit received from the transponder unit for varying the rate at which the bits of the meter identification code are transmitted.

26. In a power distribution network having a multiplicity of transmission line paths coupled to a plurality of meters and a plurality of transponder units adapted to store and send meter reading codes, a central control unit comprising;

means for storing a plurality of meter identification codes each said code comprising a plurality of bits, means for sequentially sending said meter identification codes to said plurality of transponder units, means for storing a meter reading code from a responding transponder unit, said means for storing a meter reading code comprising a meter code store and strobe means having an output coupled to the meter code store, said strobe means being responsive to the duration of each received bit of the meter reading code for generating an output pulse which enters each bit into the meter code store, said strobe means including means for time varying the output pulse from the strobe means depending upon the duration of the received bit signal, and means coupled from said means for storing to said means for sequentially sending responsive to the duration of each bit received from the transponder unit for varying the rate at which the bits of the meter identification code are transmitted.

27. Apparatus for automatically reading, from a remote location, a plurality of utility meters respectively metering the consumption of a utility by a plurality of users, each meter being connected to said remote location by a plurality of paths of an electrical power distribution network, comprising means for determining the maximum delay of information signals transmitted over said network between said remote location and said meters and for generating a control signal which is a function of said maximum delay and means responsive to said control signal for decreasing the rate of transmission of said information signals as said maximum delay increases and for increasing the rate of transmission of said signals as said maximum delay decreases.

28. A method of automatically reading, from a remote location, a plurality of utility meters respectively metering the consumption of a utility by a plurality of users, each meter being connected to said remote location by a plurality of paths of an electrical power distribution network, comprising the steps of determining the maximum delay of information signals transmitted over said network between said remote location and said meter, generating a control signal which is a function of said maximum delay, and, in response to said control signal, decreasing the rate of transmission of said information signals as said maximum delay increases and increasing the rate of transmission of said signals as said maximum delay decreases.

* * * * *

PO-1050
(5/69)

UNITED STATES PATENT OFFICE
CERTIFICATE OF CORRECTION

Patent No. 3,733,586 Dated May 15, 1973

Inventor(s) Joe F. Lusk, William H. Rood & Herbert L. Feldman

It is certified that error appears in the above-identified patent and that said Letters Patent are hereby corrected as shown below:

ABSTRACT, Col. 2, line 10, "codes" should be --coded--; Col. 1, line 5, after "July 9, 1970" should be --and now abandoned--; Col. 3, line 56, "line three wire" should be --three wire line--; Col. 7, line 41, "ST)" should be --(SI)--; Col. 14, line 13, "40" should be --140--.

Signed and sealed this 20th day of November 1973.

(SEAL)
Attest:

EDWARD M.FLETCHER,JR.
Attesting Officer

RENE D. TEGTMEYER
Acting Commissioner of Patents